Feb. 7, 1939.  J. ERWOOD  2,146,253
PHONOGRAPH TURNTABLE DRIVE
Filed June 30, 1938
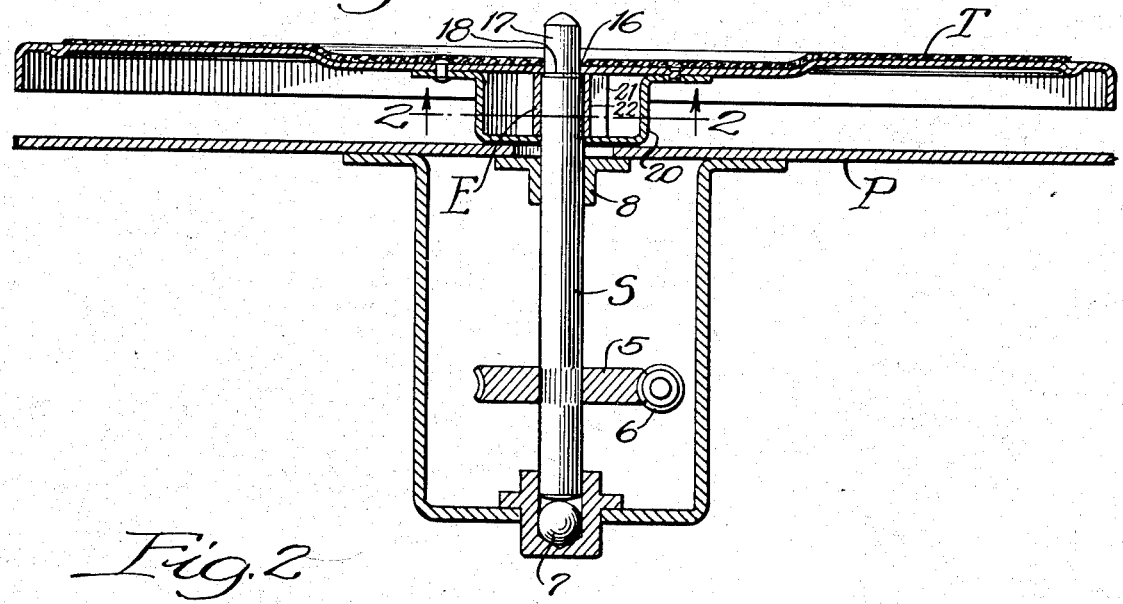
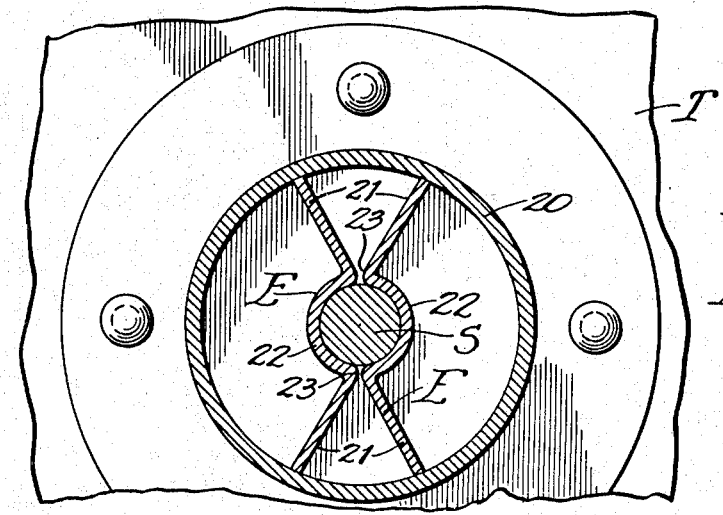
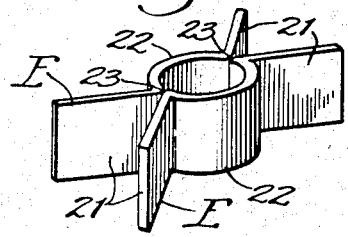
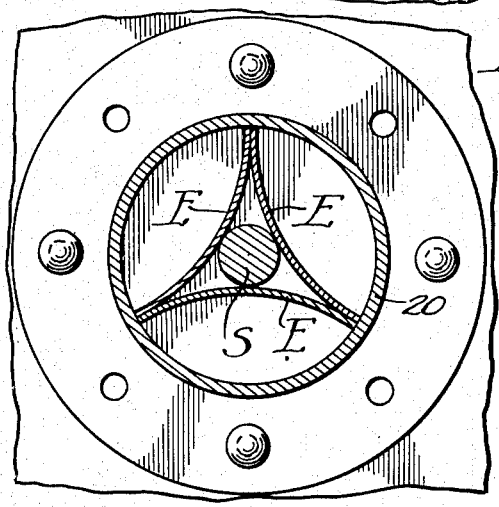
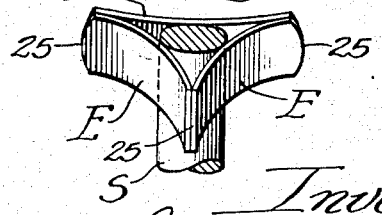
Inventor:
Joseph Erwood,
By Schmidt & Schmidt
Attorneys.

Patented Feb. 7, 1939

2,146,253

UNITED STATES PATENT OFFICE 2,146,253

PHONOGRAPH TURNTABLE DRIVE

Joseph Erwood, Chicago, Ill., assignor to The Webster Company, Chicago, Ill., a corporation of Illinois Application June 30, 1938, Serial No. 216,741

4 Claims. (Cl. 64—30)

The principal object of this invention is to provide an improved releasable driving connection between a spindle and phonograph turntable. An outstanding feature of this invention is the ease and simplicity of producing and assembling the necessary parts as will appear by reference to the accompanying drawing, wherein—

Figure 1 is a view in vertical section through a turntable in operative relation to its driving spindle, the latter being shown in elevation;

Fig. 2 is an enlarged horizontal section taken on line 2—2 of Fig. 1;

Fig. 3 is a detail in perspective of the transmission unit;

Fig. 4, which is a view similar to Fig. 2, shows a transmission unit of modified construction; and Fig. 5 is a detail in perspective of the transmission unit shown in Fig. 4.

In the particular embodiment of my invention here illustrated, a spindle S, rotated through a geared wheel 5 which is turned by a worm shaft 6, is mounted upon a thrust bearing 7, and extends up through a second bearing 8 which may be affixed to a platform P. Fitted upon the upper end of the spindle is a turntable T equipped with a hole 16 capable of receivng the tip 17 of the spindle which is of reduced diameter above a shoulder 18 which is beveled for reasons which will presently appear. The turntable is adapted to rest upon the shoulder when mounted in operative position.

In connection with the turntable is a circular wall 20 which may constitute a hub therefor, such a wall enclosing a transmission unit which may comprise a plurality of elements E extending between the spindle and turntable wall. As shown in Figs. 2 and 3, each element may be in the form of a leaf spring having end wings 21 and a central bowed portion 22, the two elements, in the absence of the spindle, exerting little or no pressure against each other or the hub. When positioned within the circular enclosing wall, they may remain somewhat loose with their bowed portions touching at the corners 23 (Fig. 3). When the spindle is inserted through the turntable, the tip proceeds first between the central portions of the transmission elements, then the beveled shoulder, and finally the spindle body itself which thrusts the bowed portions of the springs apart. In so doing a radial force is exerted which is resolved into component forces along the wings with a resulting frictional engagement between the wing ends and the circular wall. Under such conditions the transmission elements are tensioned sufficiently to establish a frictional connection with the spindle as well.

According to the construction suggested in Figs. 4 and 5, the transmission elements E which may conveniently consist of three leaf springs are inwardly bowed endwise with the opposite ends 25 transversely bowed for point contact with the circular wall. Each spring itself it adapted for point contact in its middle region with the spindle. Such a formation of the transmission elements will produce a degree of friction between the spindle and circular wall sufficient to establish a driving connection by which rotation of the turntable will be assured.

From the foregoing description it will be apparent that I have developed a novel and effective transmission by which to establish a releasable friction drive between a spindle and phonograph turntable, the several parts being inexpensive to produce and assemble, and being tensioned only when the turntable is positioned for operation upon the spindle.

I claim:

1. A driving connection between a spindle and turntable comprising a plurality of springs each having a curved portion in frictional engagement with the spindle and all together engaging therewith throughout substantially 360°, and means connecting the springs frictionally with the turntable, the degree of friction between the springs and turntable being increased sufficiently to establish a driving connection therewith when the springs are in frictional engagement with the spindle.

2. A driving connection between a spindle and turntable comprising a plurality of coacting resilient transmission elements each adapted to engage with the spindle, and means in connection with the turntable with which the transmission elements are adapted to frictionally engage, the transmission elements being placed under tension when the spindle is in engagement therewith whereby a frictional driving connection is completed between the spindle, transmission elements and turntable.

3. A drivng connection between a spindle and turntable comprising a plurality of bowed leaf springs each adapted to frictionally engage with the spindle, and means in connection with the turntable with which the springs are adapted to frictionally engage, the springs being placed under tension when the spindle is in engagement therewith whereby a frictional driving connection is completed between the spindle, springs and turntable.

4. A driving connection between a spindle and turntable comprising a plurality of coacting resilient transmission elements each adapted to frictionally engage with the spindle, and a hollow hub in fixed connection with the turntable against which the transmission elements are adapted to frictionally engage, the transmission elements being placed under tension when the spindle is in engagement therewith whereby a frictional driving connection is completed between the spindle, transmission elements and turntable hub.

JOSEPH ERWOOD.